(12) United States Patent
Körner et al.

(10) Patent No.: US 11,697,257 B2
(45) Date of Patent: Jul. 11, 2023

(54) METHOD FOR MOUNTING FUNCTIONAL ELEMENTS IN A LENS

(71) Applicants: Metamaterial Inc., Dartmouth (CA); Tobii AB, Danderyd (SE)

(72) Inventors: Lutz Körner, Urdorf (CH); Peter Hess, Menzingen (CH); Alexander Greber, Eich (CH); Urs Büttiker, Meierskappel (CH); Reto Müller, Ermensee (CH); Anders Höglund, Danderyd (SE); Daniel Ljunggren, Danderyd (SE)

(73) Assignees: Metamaterial Inc., Dartmouth (CA); Tobii AB, Danderyd (SE)

( * ) Notice: Subject to any disclaimer, the term of this patent is extended or adjusted under 35 U.S.C. 154(b) by 343 days.

(21) Appl. No.: 17/280,166

(22) PCT Filed: Sep. 25, 2019

(86) PCT No.: PCT/EP2019/075939
§ 371 (c)(1),
(2) Date: Mar. 25, 2021

(87) PCT Pub. No.: WO2020/064879
PCT Pub. Date: Apr. 2, 2020

(65) Prior Publication Data
US 2021/0339490 A1    Nov. 4, 2021

(30) Foreign Application Priority Data

Sep. 25, 2018  (CH) ..................... 01167/18
Dec. 20, 2018  (EP) ..................... 18214660

(51) Int. Cl.
*B29D 11/00*    (2006.01)
*G02B 5/04*     (2006.01)
(Continued)

(52) U.S. Cl.
CPC .. *B29D 11/00807* (2013.01); *B29D 11/00009* (2013.01); *B29D 11/0073* (2013.01);
(Continued)

(58) Field of Classification Search
CPC ........ B29D 11/00807; B29D 11/00009; B29D 11/0073; G02B 5/04; H04N 23/55; H04N 23/72
See application file for complete search history.

(56) References Cited

U.S. PATENT DOCUMENTS

| | | | |
|---|---|---|---|
| 9,636,050 | B1 | 5/2017 | Etzkorn et al. |
| 2006/0126698 | A1 | 6/2006 | Blum et al. |

(Continued)

FOREIGN PATENT DOCUMENTS

| | | |
|---|---|---|
| CN | 101646968 A | 2/2010 |
| CN | 101821085 A | 9/2010 |

(Continued)

OTHER PUBLICATIONS

First Office Action, CN Application No. 201980063169.2, dated Aug. 1, 2022, pp. 1-6.
(Continued)

*Primary Examiner* — Mathieu D Vargot
(74) *Attorney, Agent, or Firm* — Kory D. Christensen

(57) ABSTRACT

A method for mounting functional elements in a lens includes mounting the functional elements on a foil, applying a closed contour alignment surface of an alignment tool having a central opening surrounded by the closed contour on the foil portion opposite to the mounted function elements, applying underpressure on the central opening to maintain the foil portion with the mounted functional elements on the alignment tool, cutting a flap including the foil portion and supporting the functional elements out of the foil, positioning and aligning the flap through actuator,
(Continued)

fixing the position of the flap against the adjacent foil surface, embedding the foil with the mounted functional elements in a predetermined distance to the front surface of a mould, and casting and curing the lens with the embedded foil.

20 Claims, 11 Drawing Sheets

(51) Int. Cl.
    *H04N 23/55*     (2023.01)
    *H04N 23/72*     (2023.01)

(52) U.S. Cl.
    CPC ............... *G02B 5/04* (2013.01); *H04N 23/55* (2023.01); *H04N 23/72* (2023.01)

(56) References Cited

U.S. PATENT DOCUMENTS

| | | | |
|---|---|---|---|
| 2006/0192306 A1* | 8/2006 | Giller | B29D 11/00009 264/1.7 |
| 2007/0069418 A1* | 3/2007 | Liao | B29C 43/18 264/238 |
| 2012/0148820 A1* | 6/2012 | Okuya | H01L 24/97 257/E33.059 |
| 2014/0273316 A1 | 9/2014 | Pugh et al. | |
| 2015/0009309 A1 | 1/2015 | Heinrich et al. | |
| 2015/0183173 A1 | 7/2015 | Linhardt et al. | |
| 2015/0293375 A1 | 10/2015 | Pfeffer et al. | |
| 2016/0144582 A1 | 5/2016 | Ihara et al. | |
| 2017/0074494 A1 | 3/2017 | Thomas | |
| 2017/0090564 A1 | 3/2017 | Gustafsson et al. | |

FOREIGN PATENT DOCUMENTS

| | | |
|---|---|---|
| CN | 104149260 A | 11/2014 |
| CN | 105980910 A | 9/2016 |
| CN | 107438515 A | 12/2017 |
| EP | 2848979 A2 | 3/2015 |
| WO | 2006091873 A2 | 8/2006 |
| WO | 2015162498 A1 | 10/2015 |
| WO | 2018087011 A1 | 5/2018 |

OTHER PUBLICATIONS

International Search Report issued in PCT/EP2019/075939 dated Feb. 13, 2020, pp. 1-4.

* cited by examiner

METHOD FOR MOUNTING FUNCTIONAL ELEMENTS IN A LENS

TECHNICAL FIELD

The present invention relates to a method for mounting functional elements in a lens.

PRIOR ART

Miniaturization of cameras and other optical elements provide fields for new applications relating to the vision of users.

US 2015/0009309 shows an optical frame for glasses with an build-in camera and an actuator for said camera. The camera is positioned on the frame outside of the lenses.

US 2017/0090564 discloses systems and methods for providing a display of a wearable device and is related to elements for an eye-tracking device. Such devices need illumination; usually provided by LEDs and cameras directed towards the eye for determining the gaze. It is disclosed that the illuminating elements can be provided on or in a lens of glasses. These LEDs as well as sensors for sensing the light reflected from an illuminated eye can be provided on flexible printed circuits which are oriented to minimize the visible profile thereof.

WO 2006/091873 shows manufacturing methods for embedded optical systems, wherein different optical elements as mirrors, etc. are integrated within a glass body being prepared by providing a mould assembly, attaching the optical elements to a wall of the mould cavity and introducing an optical polymerizable casting compound into the mould cavity to obtain the optical component after curing.

WO 2015/162498 discloses an eyewear lens production using multi-layer additive techniques, where radiation polymerizable material is applied to the lens substrate and irradiated later on with controlled radiation so that an additive layer is formed at the selected irradiated areas according to the intended layer design.

EP 2 848 979 provides disclosure for different methods and apparatuses for providing variable optic inserts into ophthalmic lenses.

US 2017/0074494 provides over-moulded LEDs in virtual reality headsets.

US 2014/273316 A1 discloses methods and apparatus to form organic semiconductor transistors upon three-dimensionally formed insert devices. The three-dimensional surfaces incorporate with organic semiconductor-based thin film transistors, electrical interconnects, and energization elements into an insert for incorporation into ophthalmic lenses. The formed insert may be directly used as an ophthalmic device or incorporated into an ophthalmic device.

U.S. Pat. No. 9,636,050 B1 discloses a body-mountable device with two polymer layers and a structure with a sensor between these polymer layers. Forming the body-mountable device involves positioning the structure on the first polymer layer and then forming, in a molding piece, the second polymer layer over the structure positioned on the first polymer layer. The molding piece includes a surface that supports the second polymer layer during its formation and a protrusion that extends from the surface to the sensor through the second polymer layer in formation. The body-mountable device that is removed from the molding piece has a channel to the sensor formed by the protrusion.

SUMMARY OF THE INVENTION

Based on the prior art it is an object of the invention to provide an improved method for placing and orienting functional elements in lenses. Such functional elements can be light sources as LED's and miniature cameras as well as passive functional elements as crystals, e.g. diamonds or other light reflecting or diffracting elements as mirrors or gratings.

Such a method for mounting functional elements in a lens comprises the steps of: mounting the functional elements on a foil, applying a closed contour alignment surface of an alignment tool having a central opening surrounded by the closed contour on the foil portion opposite to the mounted function elements, applying underpressure on the central opening to maintain the foil portion with the mounted functional elements on the alignment tool, cutting a flap comprising the foil portion and supporting the functional elements out of the foil, positioning and aligning the flap through actuators, fixing the position of the flap against the adjacent foil surface, embedding the foil with the mounted functional elements in a predetermined distance to the front surface of a casting mould, and casting and curing the lens with the embedded foil. Here, no specific FPCB is provided on the mould opposite to the mould supporting the foil and having the central opening for positioning and aligning the functional elements in view of the foil. Then passive functional elements can be contacted directly and active functional elements are to be contacted through the foil portion, e.g. by contact elements passing through the foil.

The step of mounting the functional element on a foil can be preceded by placing the functional element on a flexible printed circuit board (FPCB) and affix it there. The flexible printed circuit board can be provided near and at the edges of the lens to be fabricated and comprise contact plates for active functional elements as cameras and light sources as LEDs. Then the method for mounting functional elements in a lens comprises the steps of: mounting the functional elements on a FPCB and affix it there, mounting the FPCB with the affixed functional elements on a foil and affix it there, applying a closed contour alignment surface of an alignment tool having a central opening surrounded by the closed contour on the foil portion opposite to the mounted function elements, applying underpressure on the central opening to maintain the foil portion with the mounted functional elements on the alignment tool, cutting a hole in the foil portion with the functional elements supported by the FPCB or cutting a flap comprising the foil portion and the functional elements supported by the FPCB out of the foil, respectively, positioning and aligning the functional elements supported by the FPCB on the cut-out foil portion or the flap with the functional elements supported by the FPCB through actuators, respectively, fixing the position of the cut-out foil portion with the functional elements on the FPCB or the position of the flap against the adjacent foil surface, embedding the foil with the mounted functional elements on the FPCB in a predetermined distance to the front surface of a casting mould, and casting and curing the lens with the embedded foil.

The method can have a step of placing the functional element on a flexible printed board circuit and affix it there with positioning the flexible printed board circuit on the surface of a mould, especially in complementary recesses, and applying underpressure from the mould side through at least one vacuum channel in the mould, wherein the functional element is positioned by a functional element alignment tool through the vacuum channel on the flexible printed board circuit.

A further method for mounting functional elements in a lens comprises the steps of mounting a functional element on a flexible printed board circuit, providing an alignment element on a foil having a predetermined mounting surface for the functional element, positioning the functional element on the alignment element, fixing the position of the functional element on the alignment element, embedding the foil with the mounted functional elements in a predetermined distance to the front surface of a mould, and casting and curing the lens with the embedded foil.

Mounting a functional element on a flexible printed circuit board can comprise providing a vacuum channel in a mould holding the flexible printed circuit board and within which vacuum channel the functional element is held with play before being positioned on the alignment element.

The functional element to be placed can comprise at least one camera or a light emitting element or a passive element.

When the functional element to be placed comprises at least one camera, then the alignment step comprises connecting the camera to a visualizing unit and providing a light source emitting light in a predetermined direction and positioning and aligning the camera based on the images obtained on the visualizing unit from the camera.

When the functional element to be placed comprises at least one light source, then the alignment step comprises providing a camera and a visualizing unit, wherein the camera receives light from the light source, and positioning and aligning the light source is based on the images obtained on the visualizing unit from the camera.

Finally, when the functional element to be placed comprises a passive element reflecting or diffracting incoming light, then the alignment step comprises providing a light source, a camera and a visualizing unit, wherein the camera receives light from the passive element illuminated by the light source, and positioning and aligning the passive element is based on the images obtained on the visualizing unit from the camera.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
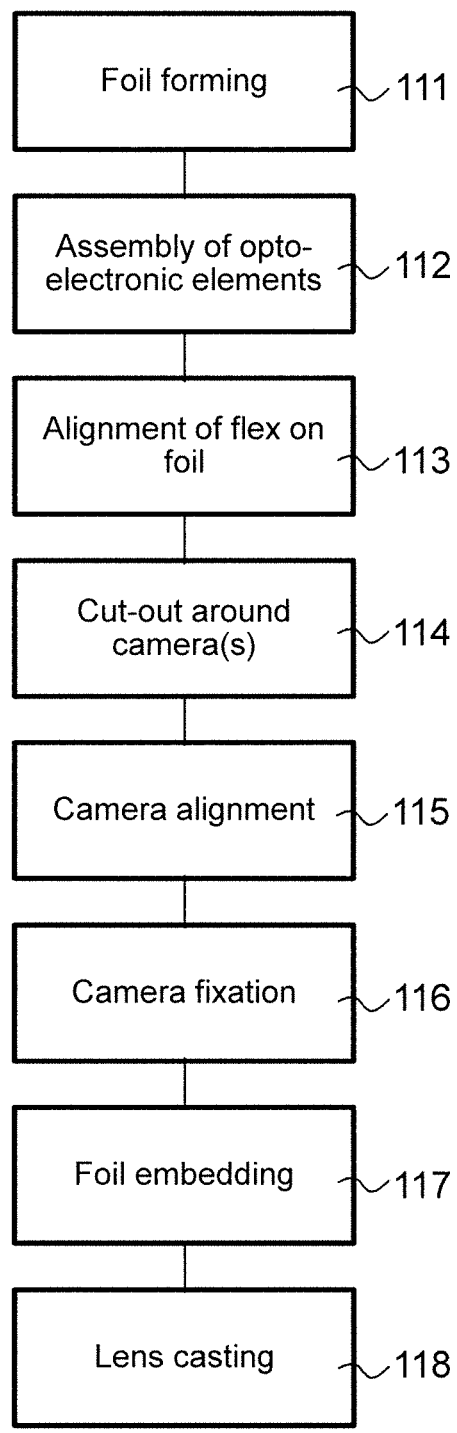
FIG. 1 shows a flow chart of a method producing an optical element according to an embodiment of the invention.
Figure 2:
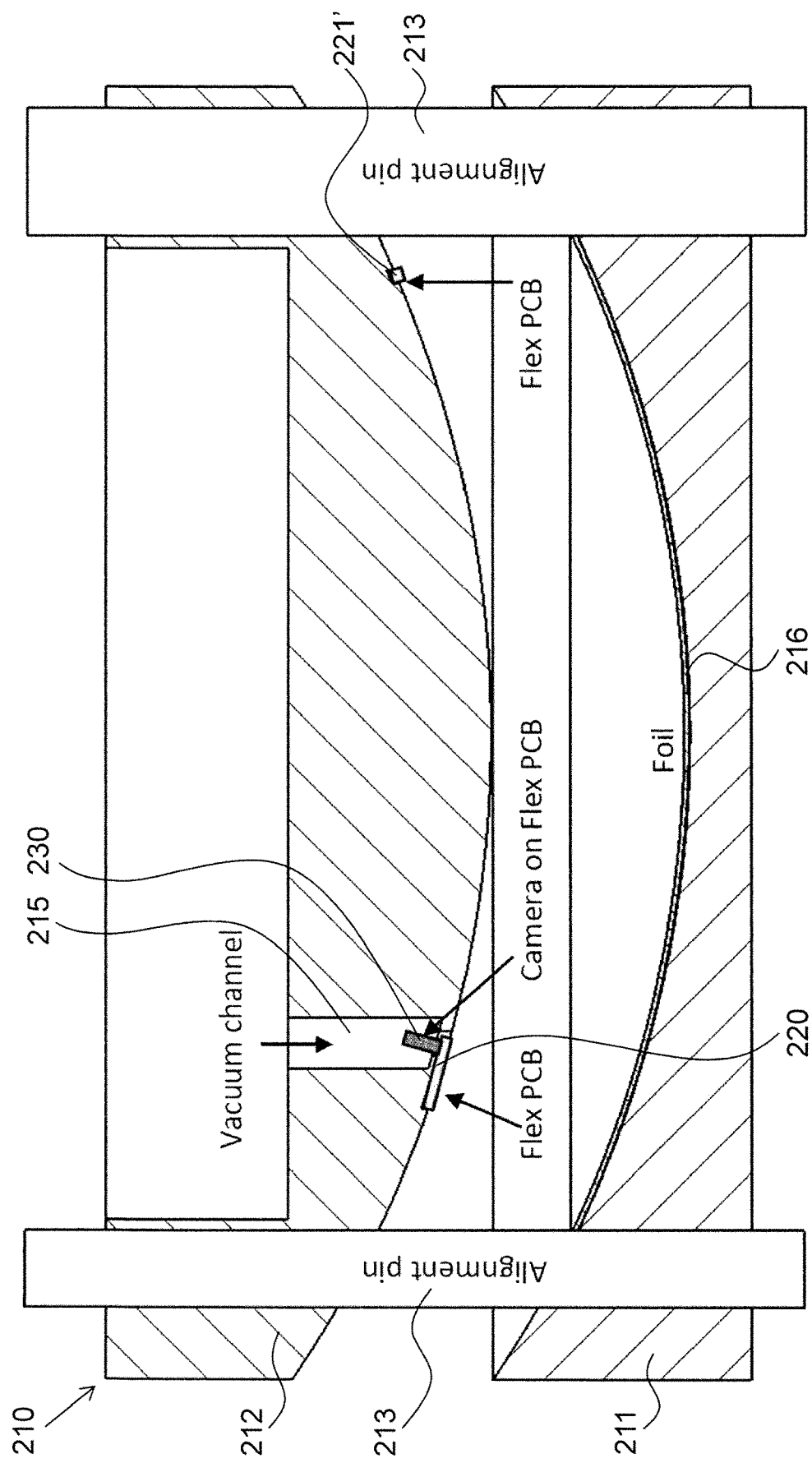
FIG. 2 shows a schematical cross-section view of a device for producing the optical element according to a method according to FIG. 1 during one of the method steps.
Figure 3A:
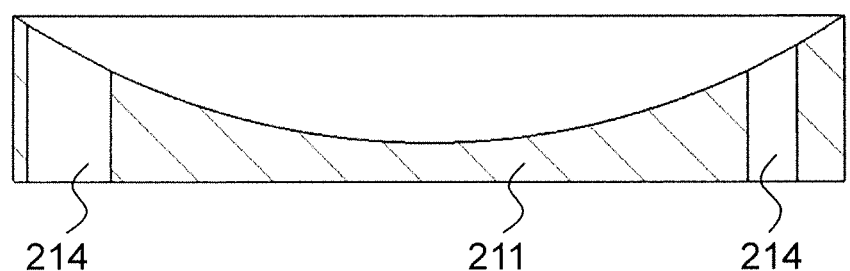
FIG. 3A shows a schematical cross-section view of one mould of the device of FIG. 2 at an earlier method step.
Figure 3B:
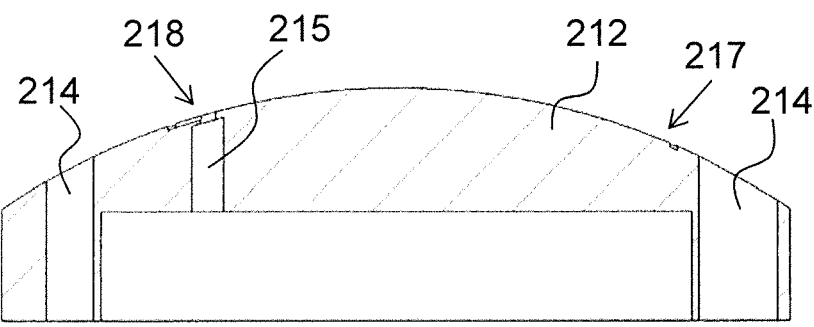
FIG. 3B shows a schematical cross-section view of a further mould of the device of FIG. 2 at an earlier method step.
Figure 3C:
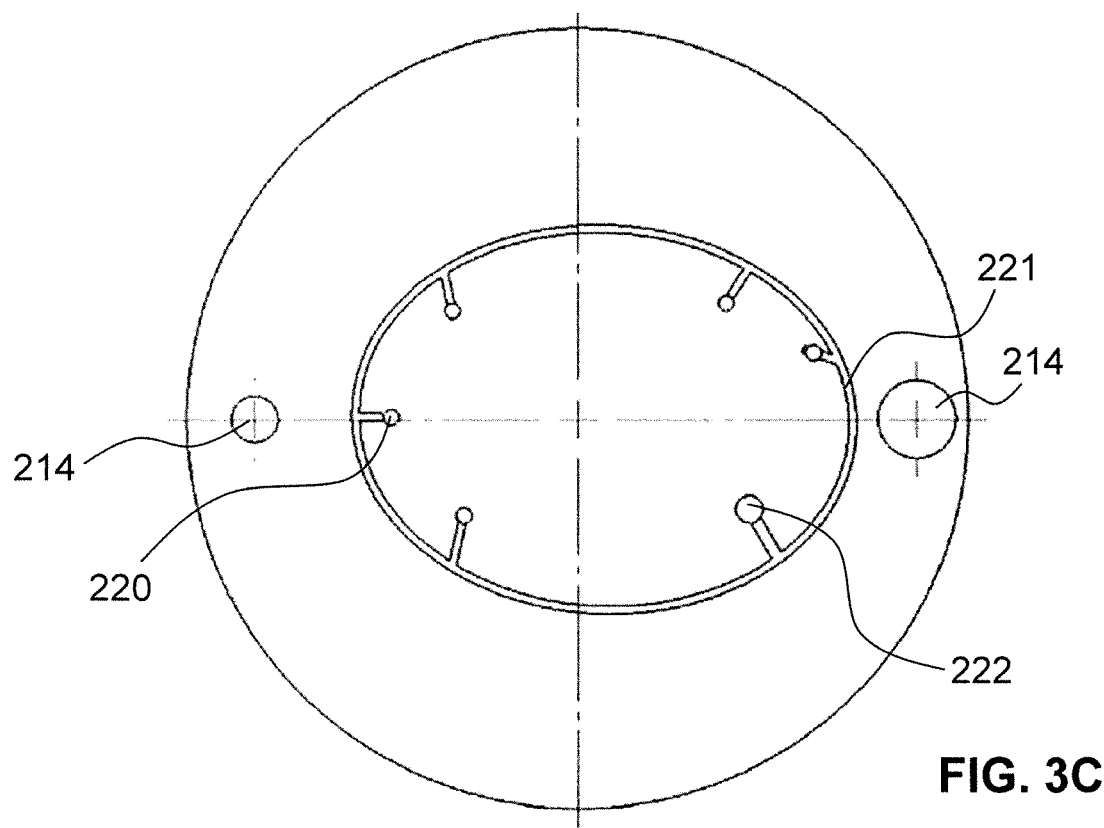
FIG. 3C shows the mould of FIG. 3B in a view from above.
Figure 3D:
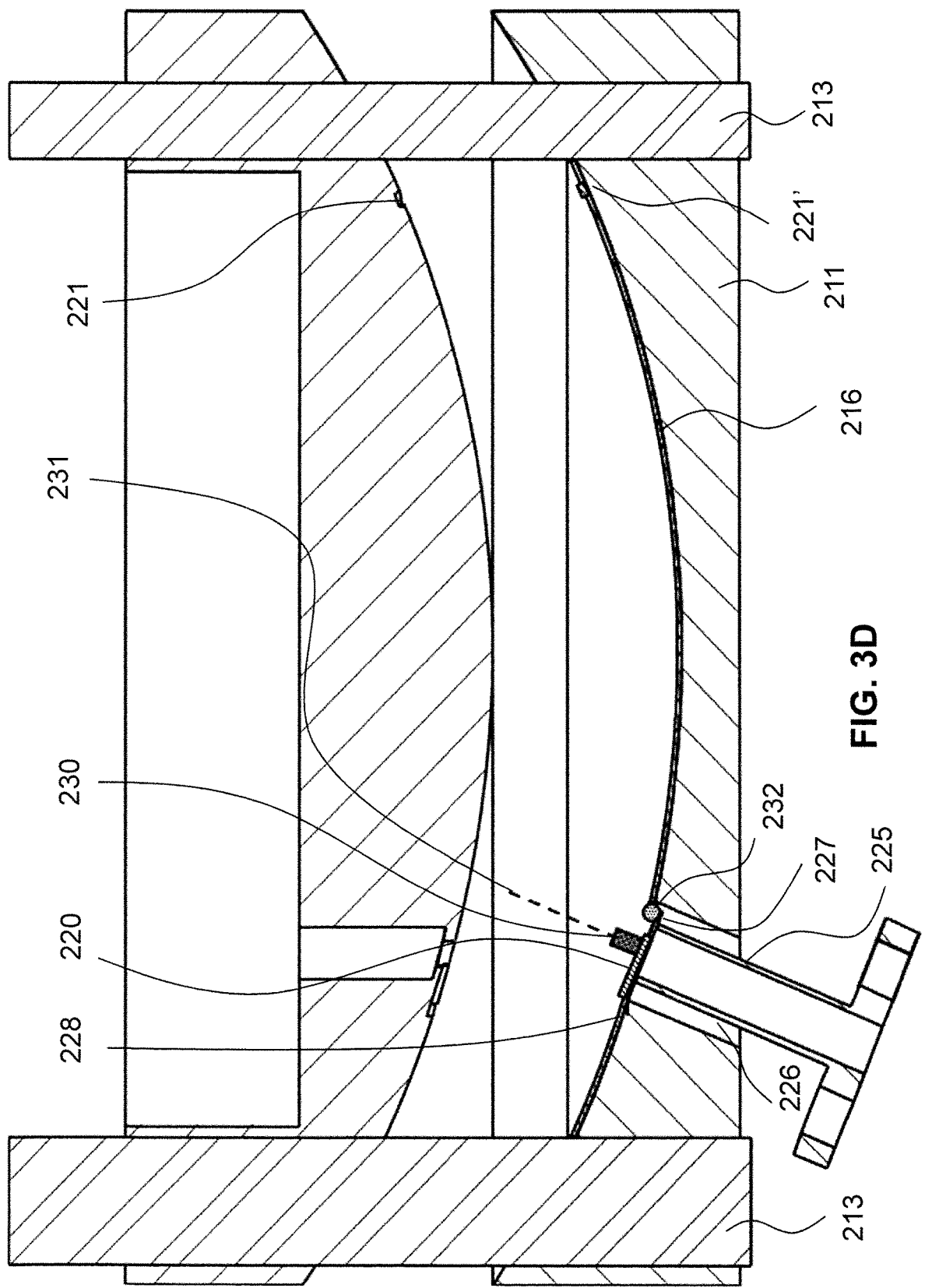
FIG. 3D shows the device of FIG. 2 at a later method step.

FIG. 1 shows a flow chart of a method producing an optical element according to an embodiment of the invention. The flow chart is explained in connection with FIG. 2 showing a schematical cross-section view of a device 210 for producing the optical element according to a method according to FIG. 1 at one method step as well as FIG. 3A to FIG. 3D. FIG. 3A shows a schematical cross-section view of one mould as first part 211 of the alignment device of the device of FIG. 2 at an earlier method step, FIG. 3B shows a schematical cross-section view of another mould being the second part 212 of the alignment device 210 of FIG. 2 at an earlier method step, FIG. 3C shows the mould 212 of FIG. 3A in a view from above, and FIG. 3D shows the device 210 of FIG. 2 at a later method step. The first and second parts 211 and 212, respectively, as first and second parts of the alignment device are only used for the alignment. Preferably, the lenses are cast with different (glass) moulds. These parts are therefore only used to align the flex with the foil. The embodiment related to FIGS. 1, 2 and 3A to 3D relates to embedding opto-electronic elements in lenses with a defined position as well as a defined spatial alignment, based on a multi-stage process. The position of the opto-electronic element is related to the position in the lens in relationship to a coordinate system of the lens. The spatial alignment is related to the main axis and direction of the optical element, e.g. the direction 231 in FIG. 3D. The optical element produced according to the method can be used for eye tracking functionality through embedded miniature cameras as well as illuminating elements. These functional elements are called active elements, since they either emit light or detect light. Other functional elements can be passive elements as crystals as e.g. diamonds or mirror pieces or gratings, which simply reflect, transmit or diffract light directed on these passive elements. The effect of such passive elements are therefore related based on the position and orientation of e.g. the crystal or diffracting structure.

One advantage of the method according to the invention is based on the predetermined correct positioning and alignment according to a predefined angle in relationship to the lens geometry. Passive functional elements 230 can be mounted directly on the foil 216 and aligned afterwards in an alignment step similar to step 115 explained later through alignment tool with vacuum sleeve 225. The following description explicitly allows placement of active and passive functional elements, since a FPCB is involved, provided on the mould 212 opposite to mould 211 supporting the foil 216. The method steps of the method without a FPCB are—beside the use of the FPCB as intermediate external contact element provided directly between the functional element 230 and the foil 216—identical.

The method as shown in FIG. 1 starts with a foil-forming step 111, within which a foil 216 is formed to match the curvature of the lens. The mould 211 can comprise one or more through going holes (not shown, from the flat exterior surface towards the concave surface in FIG. 3A) to hold the foil 216 through applying vacuum from the back side or the mould 211 can be made out of a micro-porous air permeable aluminium compound material as e.g. Metapor® to allow applying vacuum through the entire back side of the mould 211.

The next step in the method relates to mounting the functional elements on a flexible printed circuit board (FPCB). This step 112 mentions functional elements, which could be electronic elements such as cameras and/or LEDs as active elements. FIG. 3B shows the mould 212 as second tool in the cross sectional view, whereas FIG. 3C shows the mould 212 from above with the foil path 221 for the FPCB portion 221' to be positioned on its surface. As shown in FIG. 3C, the mould 212 comprises here an elliptic recess 217 on the outside convex surface, which recess 217 comprises here six contacts having received the reference numeral 222 for the smaller contact plates 222 and 223 for the larger contact plates. The elliptic shape of elliptic recess 217 is chosen to provide a closed recess around the center of the lens to be produced. It is possible to have a non-closed shape as a C and it is possible to have a square shape, if the glass to be produced is also essentially square. The recesses 217 are complimentary to the form of the flexible printed circuit board 220 to be positioned on the surface and in the recesses and they are preferably fitting the design of the frame of the eye-wear to be near the edge of the frame but inside the frame of the eye wear.

At the position of the opto-electronic elements at least one through-going hole 215 is prepared in mould 212 to fix the flexible printed circuit board 220 by means of vacuum from the opposite side of the tool mould 212. The second mould 212 can comprise the same alignment pin bores 214 as the first mould 211 to precisely align on one side the flexible printed circuit board 220 with the opto-electronic elements 230 with respect to the foil 216 and the second mould 212 face to the first mould 211 as shown in FIG. 2. A second alignment tool, not shown in this drawing, is used to execute the method step 115 with an alignment of the camera or cameras and LEDs in the mould to fix the camera(s) at a specific position and angle.

Method step 114 is related to applying a cut-out around the cameras 230 by using a die cutting tool from the foil. This step can be performed earlier in the process sequence. It can be seen in FIG. 3D that the foil 216, in the cross section view, is interrupted at the cutting edge 227. The cut-out around the camera 230 can have the shape of a C so that the camera 230 is positioned on the flap remaining attached to the foil 216 at line 228 (perpendicular to the drawing plan). Positioned on the sleeve 225 of the second camera alignment tool, the camera 230 can be angled by passively aligning the cut-out of the foil while holding the formed foil 216 with vacuum in place as shown in FIG. 3D. This is done preferably by holding the foil cut-out with a rubber tip, known e.g. from die bonding pick up tools, aligned at the desired angle.

The flexible conductor 221 can be positioned in the according recess and the cameras/LEDs are placed in the vacuum bore holes to attach the flex on the foil.

FIG. 3D shows the second alignment tool provided in the mould 211. The alignment tool comprises a vacuum sleeve 225 applied in a passage 226, which passage can by itself under a separate vacuum to maintain flexible printed circuit board 220 with camera 230 at the correct side. Movement of the vacuum sleeve 225 is effected with an applied internal vacuum and positions and orients the camera 230 and its central axis 231. The axis 231 is oriented as well as the position of the base of the camera 230 chip. Then a liquid adhesive medium e.g. an index matched UV-curable adhesive is added at spot 232 especially around the camera 230 on the border edge of the above mentioned e.g. C-shaped cut-out contour to execute method step 116, wherein the alignment of the camera 230 is fixed using said adhesive 232 while the position is still maintained by the second alignment tool with application of a vacuum on the vacuum sleeve 225. If the cut-out contour is C-shaped, then the contour of the adhesive 232 has as such also the shape of the C closing the gap at the edge 227.

Then, this method step 116 is followed by embedding method step 117, wherein the foil 216 with the attached aligned opto-electronic element(s), as e.g. camera 230, LEDs or passive elements, is mounted to the front of a back mould at a defined distance. FIG. 3D shows the foil on first mould 211 but it is also possible that the foil 216 is positioned in a distance from the mould 211 in order to obtain better orientation of such a camera. Within a different approach, the foil is actually mounted on the back of a front mould at a defined distance with the naked foil side facing to the front mould, but both cases are possible.

Then, the mould cavity itself is formed by aligning front and back mould 211 and 212, i.e. first and second mould, with the attached foil 216 by applying a tape or gasket to seal the mould cavity when the usual production step 118 follows, wherein the mould cavity is filled with curable resin and cured e.g. by applying UV-irradiation or heat.

In FIG. 3D the foil is on the alignment tool with the aligned camera in its fixed position. The foil is then fixed on a(nother) glass mould e.g. by applying the foil fixation method of WO 2018/087011.

Figure 4:
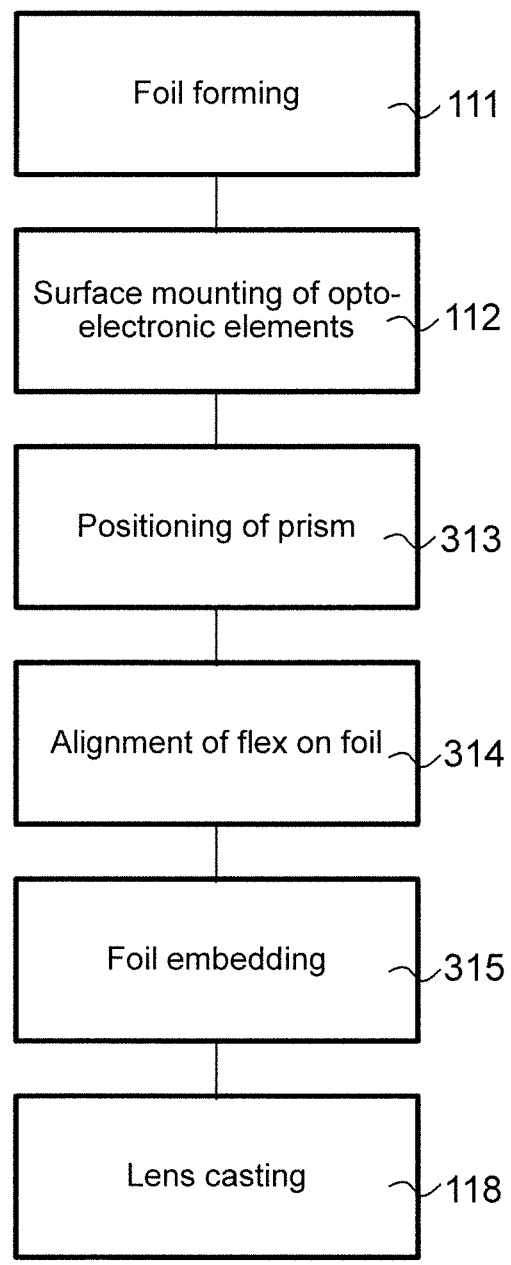
FIG. 4 shows a flow chart of a further method producing an optical element according to an embodiment of the invention.
Figure 5:
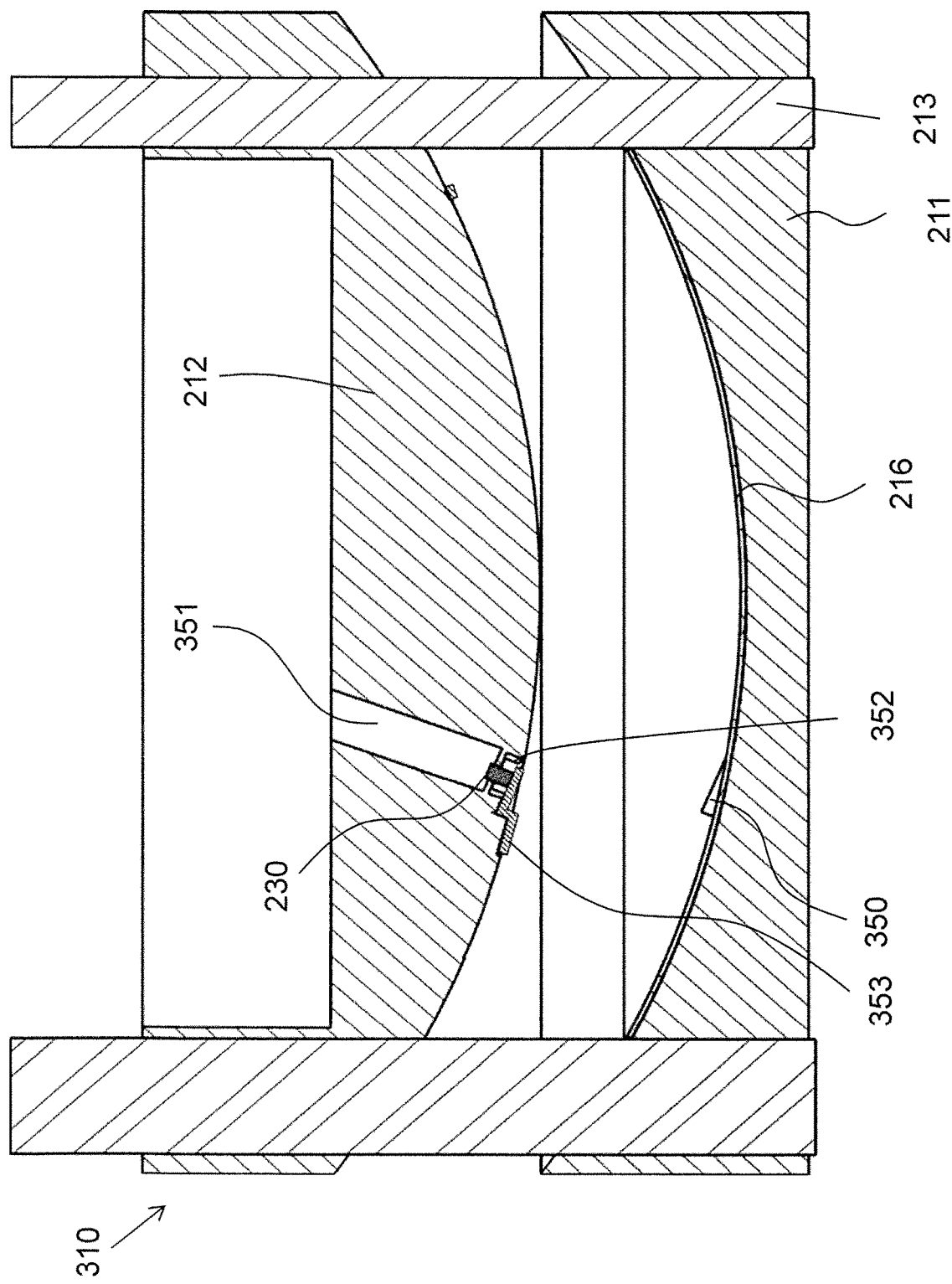
FIG. 5 shows a schematical cross-section view of a device for producing the optical element according to a method according to FIG. 4 at one method step.
Figure 6:
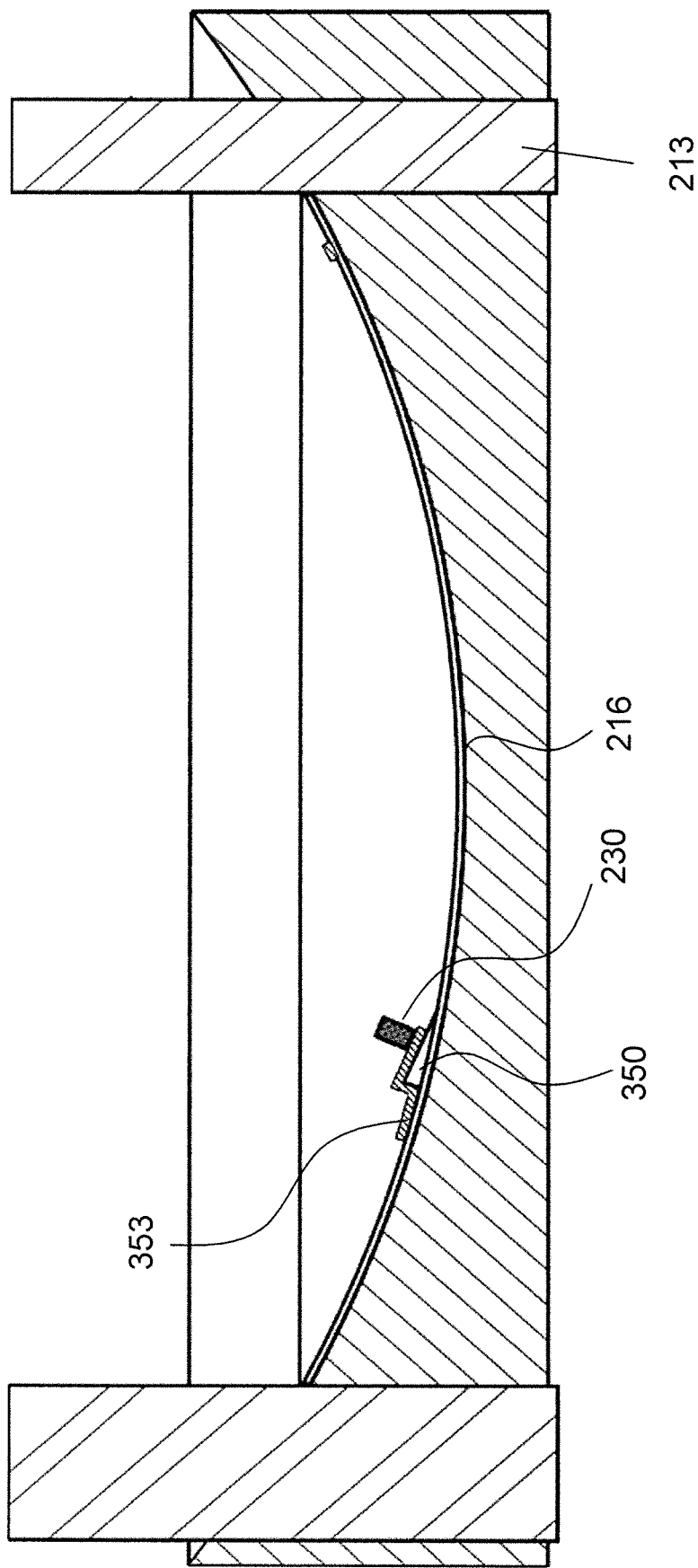
FIG. 6 shows the device of FIG. 5 at a later method step.
Figure 7:
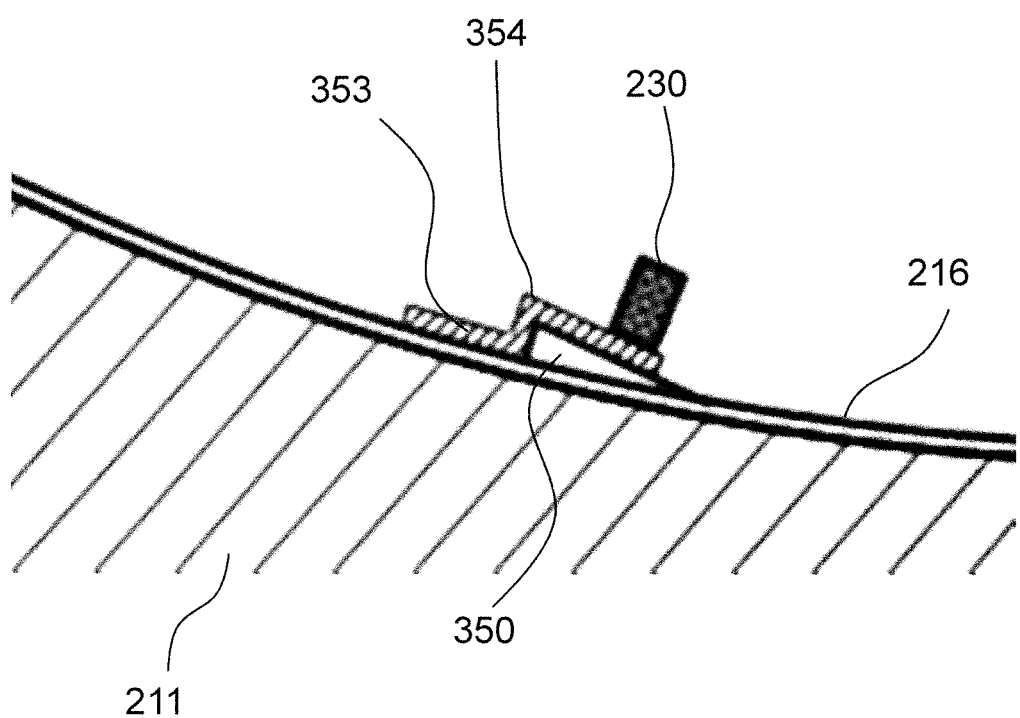
FIG. 7 shows a detail view of the device of FIG. 6.

FIG. 4 then shows a flow chart of a further method producing an optical element according to an embodiment of the invention. The flow chart is explained in connection with FIG. 5 showing a schematical cross-section view of a device 310 for producing the optical element according to a method according to FIG. 4 at one method step, wherein FIG. 6 shows the device 310 of FIG. 5 at a later method step and FIG. 7 shows a detail view of the device 310 of FIG. 6.

Same features receive the same reference numerals. This is also true for identical or very similar steps in the method step of FIG. 2.

The initial steps 111 and 112 of forming the foil and mounting the opto-electronic elements on a flexible PCB are still the same as explained in connection with FIGS. 1 to 3D.

The method according to the flowchart of FIG. 4 is related to a passive alignment of cameras, wherein a FPCB 353 can be used as substrate for the attachment of the optoelectronic elements by applying printable connectors. The printable connector of this embodiment is then attached to a prism 350.

In a different approach the printed conductor is printed directly on the surface of the wedge 350 or it can be printed on the flat foil 216 wherein the surface mount of the optoelectronic element 230 is done on the printed conductors and finally in step 119 the mould cavity is filled with a curable resin and cured by a UV radiation. Reference numeral 353 would either be a FPCB or—in case printed conductors are used—would be directly placed on the conductor on the wedge (e.g. by MID technology). Here, step 313 comprises positioning of the FPCB 353 with the camera 230 in the corresponding opening 351 which is a vacuum channel having a front part enclosing the camera 230 with play avoiding imposing a specific orientation of camera 230. The front part of the vacuum channel 351 is an indentation 352 with a central hole to steadily apply suction on the camera 230 in the indentation to maintain it prior to fixation in a still orientable way.

The camera 230 can be angled applying a cut out as explained in connection with FIG. 1 to 3D or by using the wedge or prism 350. Here the camera 230 can be aligned and electrically connected applying a part produced by e.g. MID Technology (moulded interconnect device technology). That allows producing miniature conductive elements with a high degree of freedom regarding the 3D design. It is the outer surface and angle of the prism which determines the orientation of the camera. Therefore, the method used in connection with FIG. 5 is a passive method.

FIG. 7 shows the mounted FPCB 353 with camera 230 on prism 350. The FPCB 353 portion is flexible enough to adopt the contour surface of prism 350. The thickness of the FPCB 353 is exaggerated to better show this specific element. Since the thickness is constant at the attachment of the camera 230, the camera adopts the orientation of the prism 350 and inherits the position on the prism. This means that corner 354, better the folding line at the edge of the prism 350 is not necessarily the folding line as shown in FIG. 5 but will be determined by the positioning of the camera 230 on the side surface of the prism and will follow the form of the prism 350. In FIGS. 6 and 7 the realization with the FPCB is shown with the wedge instead of cut-out, but this wedge method could also be combined with the printed conductor instead of the shown FPCB.

Figure 8:
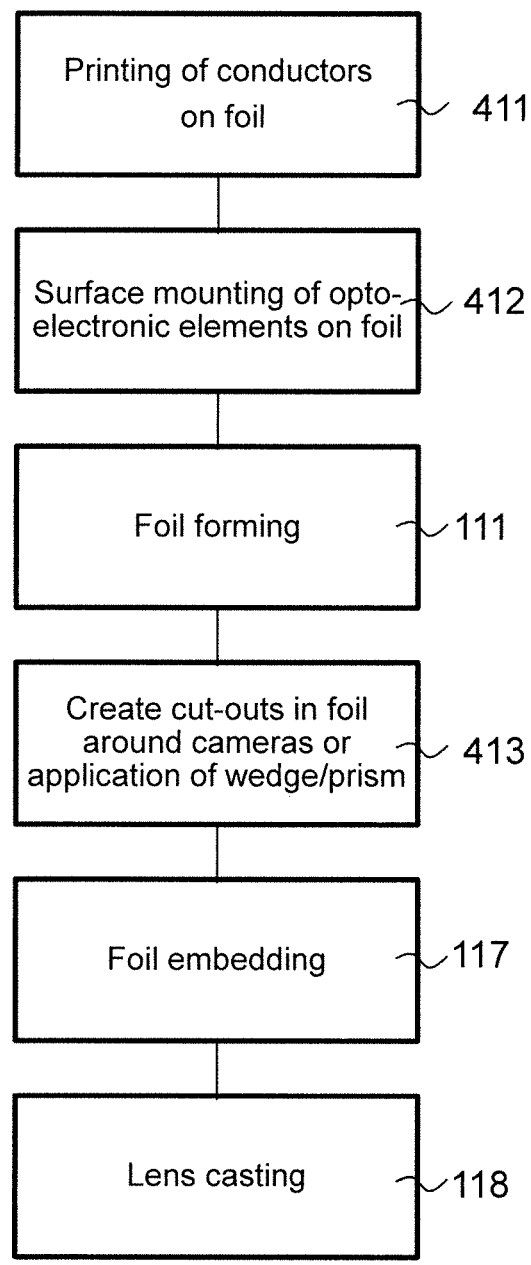
FIG. 8 shows a flow chart of a method producing an optical element according to an embodiment of the invention.
Figure 9:
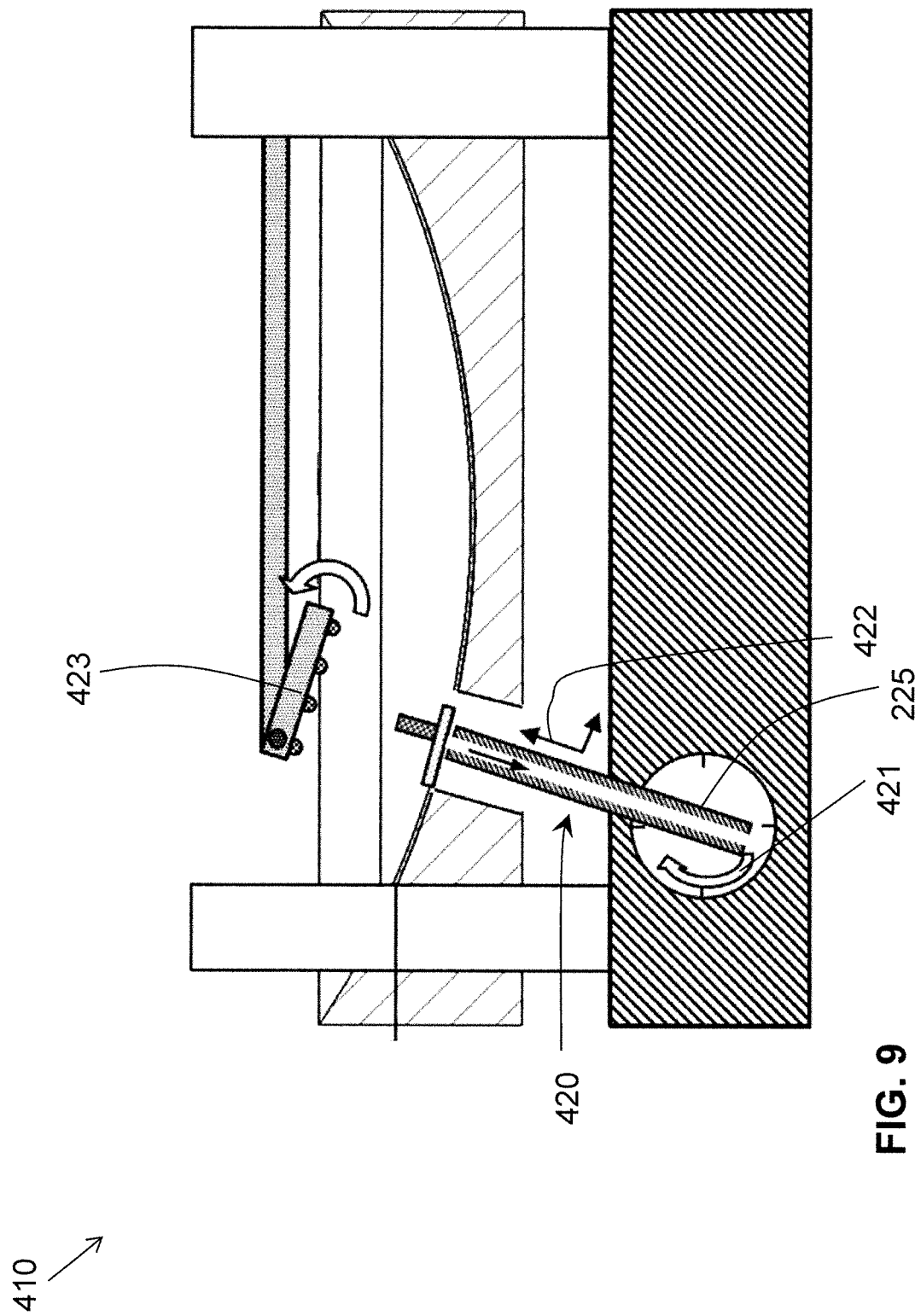
FIG. 9 shows a schematical cross-section view of a device for producing the optical element according to a method according to FIG. 8 at one method step.

FIG. 8 shows a flow chart of a method producing an optical element according to a further embodiment of the invention, which is explained in connection with FIG. 9 showing a schematical cross-section view of a further device 410 for producing the optical element according to the method according to FIG. 8 at a specific method step.

Within an alternative process sequence the foil forming step 111 to match the curvature of the lens is preceded by two further steps. One step 411 is related to printing the conductors on a flat foil, e.g. by screen printing and curing the conductors. The second step 412 is related to mounting of optoelectronic elements such as cameras 230 and/or LEDs on the prepared flat foil with conductors.

Then as in the previously described method, in a positioning step 413, a cut-out is created in the foil for a flap with the camera mounted thereon and a following positioning and alignment procedure with the alignment tool or the element as camera 230 is placed on the wedge or prism wherein the conductors can be e.g. applied according to MID Technology to conform to the additional form of the prism 350 allowing for direct alignment of the camera on the wedge.

Then the steps of foil embedding 117 and lens casting 118 follow as explained above.

FIG. 9 shows an active alignment tool 420 with alignment reference structure 423 being e.g. an LED array used for adjusting the position and angle of the camera 230 by a vacuum tool 225. The camera 230 is connected to the supply unit and the camera 230 is used to align it by evaluating the image of the reference structure 423 which will change following change of position and orientation of camera 230. The arrows 421 and 422 represent micrometre screws which are positioned at the vacuum channel 225 in order to displace it against the flexible printed circuit board with the attached camera 230 which is then aligned in a different way towards the reference structure 423. Reference numeral 421 represents tilting and rotation of the camera, while reference numeral 422 represents a linear positioning movement.

Figure 10:
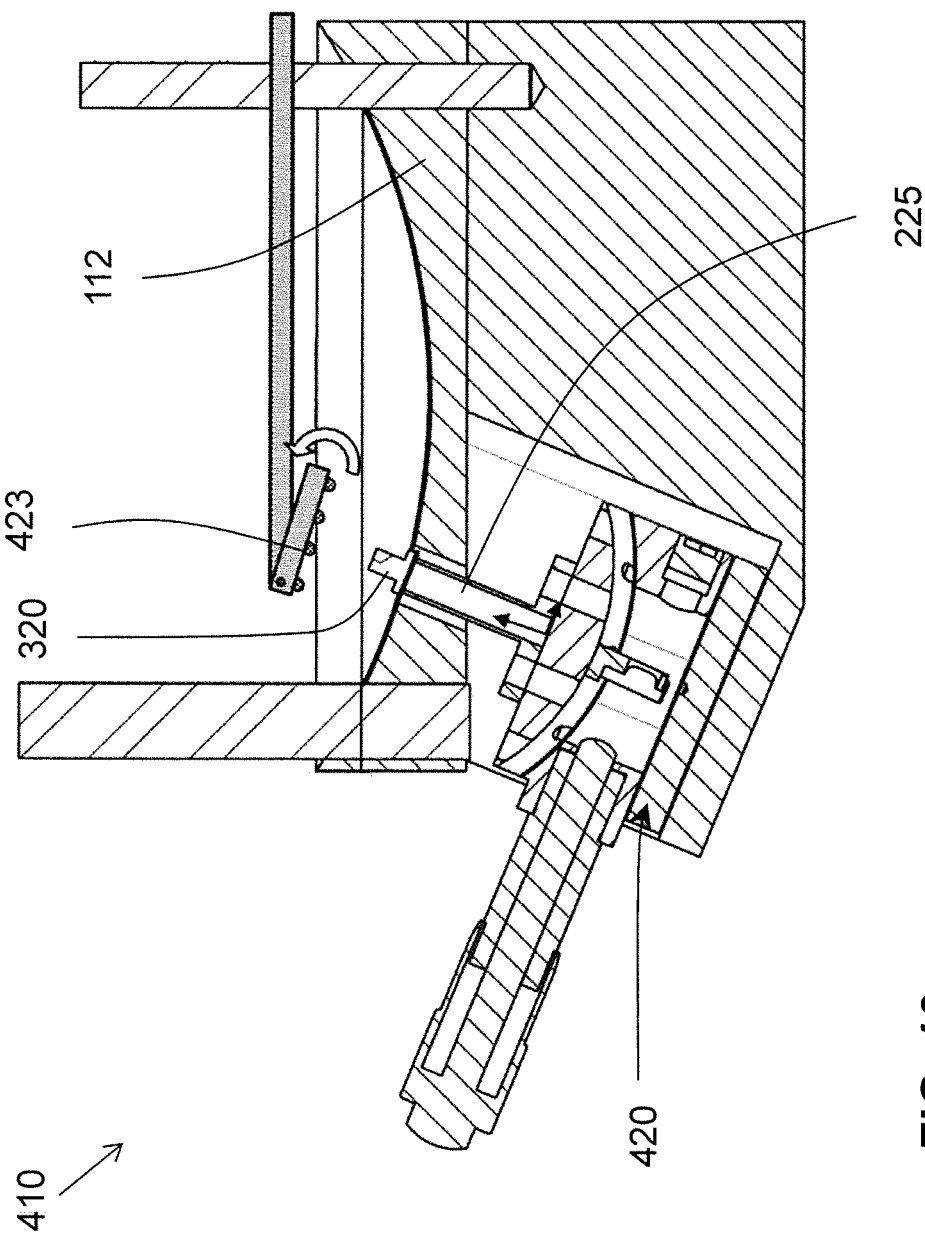
FIG. 10 shows a schematical cross-section view of a further device for producing the optical element according to a method according to FIG. 8 at one method step.

FIG. 10 shows a further device 410, wherein the alignment tool comprises a micrometer screw device 420 which provide the lateral displacement 422 as well as the rotation and tilting 421 as indicated in FIG. 9.

LIST OF REFERENCE SIGNS 111 foil forming step
112 functional element mounting step on FPCB
113 alignment and fixation of FPCB
114 cut-out of camera
115 alignment of camera
116 fixation of aligned camera
117 positioning of foil with functional element in mould
118 filling of mould with polymer and curing of polymer
210 device
211 first mould
212 second mould
213 alignment pin
214 alignment bore
215 vacuum channel
216 foil
217 groove
218 recess
220 flexible printed circuit board
221 hole for opto-electronic element
221' FPCB conducting path
222 hole for opto-electronic element
223 further FPCB contact
225 vacuum sleeve
226 passage
227 cutting edge
228 foil flap/cut-out
230 camera
231 central axis
232 liquid adhesive spot
310 device
313 positioning of prism
314 positioning step
315 foil mounting step
350 prism
351 vacuum channel
352 indention with central hole
353 printed connector
354 corner
410 device
411 printing conductors
412 mounting electronic elements on foil with conductors
413 positioning step
420 alignment tool
421 rotation actuator
422 linear displacement actuator
423 alignment reference structure

The invention claimed is:
1. A method for mounting a functional element in a lens, the method comprising:
mounting the functional element on a first portion of a foil;
applying a closed contour alignment surface of an alignment tool having a central opening on a second portion of the foil opposite to the functional element;
applying a pressure on the central opening of the alignment tool to maintain the second portion of the foil on the alignment tool;
cutting a hole in the foil to produce a cut-out including the functional element mounted thereon, or cutting the foil to create a flap in the foil containing the functional element;

aligning, via at least one actuator, the functional element on the foil of the cut-out or the flap, to a predetermined angle and position relative to a lens geometry;

fixing the position of the functional element on the foil of the cut-out against an adjacent foil surface or fixing the position of the flap with the functional element against an adjacent foil surface;

positioning the foil with the functional element at a predetermined distance from a front surface of a casting mould; and casting and curing a polymer with the functional element and foil embedded therein.

2. The method of claim 1, further comprising, before mounting the functional element on a first portion of a foil, mounting the functional element to a flexible printed circuit board.

3. The method of claim 2, wherein mounting the functional element to the flexible printed circuit board comprises:

positioning the flexible printed circuit board on a surface of the mould having complementary recesses and at least one vacuum channel;

applying a vacuum pressure from a mould side through the least one vacuum channel; and positioning the functional element via a functional element alignment tool through the vacuum channel on the flexible printed circuit board.

4. The method of claim 1, wherein the functional element includes at least one of a camera, a light emitting element, or a passive element.

5. The method of claim 1, wherein the functional element includes a camera; and aligning, via at least one actuator, the functional element on the foil of the cut-out or on the flap, to a predetermined angle and position relative to a lens geometry, further includes:

connecting the camera to a visualizing unit configured to display images obtained by the camera;

providing a light source configured to emit a reference light; and positioning and aligning the functional element based on the images displayed on the visualizing unit.

6. The method of claim 1, wherein the functional element includes a light source; and aligning, via at least one actuator, the functional element on the foil of the cut-out or on the flap, to a predetermined angle and position relative to a lens geometry, further includes:

providing a camera configured to receive light from the light source to produce an image;

providing a visualizing unit configured to display images obtained by the camera; and positioning and aligning the functional element based on the images displayed on the visualizing unit.

7. The method of claim 1, wherein the functional element includes a passive element configured to reflect or diffract incoming light; and aligning, via at least one actuator, the functional element on the foil of the cut-out or on the flap, to a predetermined angle and position relative to a lens geometry, further includes:

providing a light source configured to illuminate the passive element;

providing a camera configured to receive light emitted by the passive element when illuminated by the light source;

providing a visualizing unit configured to display images obtained by the camera; and positioning and aligning the functional element based on the images displayed on the visualizing unit.

8. The method of claim 7, wherein the passive element includes a crystal, a mirror element, or a grating.

9. The method of claim 1, further including:

capturing an image of the functional element positioned on the foil of the cut-out or an image of the flap with the functional element; and adjusting the position of the functional element on the foil of the cut-out, or the position of the flap with the functional element, based on the captured image.

10. The method of claim 9, further including displaying the captured image on a visualizing unit.

11. A method for mounting a functional element in a lens, the method comprising:

providing a prism on a foil;

positioning a functional element on the prism, the functional element including at least one of a camera, a light-emitting element, or a passive element;

fixing the position of the functional element on the prism;

positioning the foil with the functional element fixed to the prism a predetermined distance to a front surface of a mould;

casting and curing a polymer with the functional element and foil embedded therein.

12. The method of claim 11, wherein positioning the functional element on the prism further includes:

mounting the functional element on a flexible printed circuit board; and positioning the functional element on the flexible printed circuit board on the prism.

13. The method of claim 12, wherein mounting the functional element on the flexible printed board circuit further includes:

providing an alignment tool having a vacuum channel configured to hold the flexible printed circuit board or functional element; and holding the functional element via a vacuum through the vacuum channel before being positioned on the prism.

14. The method of claim 11, wherein the functional element includes a camera; and positioning the functional element on the prism, further includes:

connecting the camera to a visualizing unit configured to display images obtained by the camera;

providing a light source configured to emit a reference light; and positioning the functional element on the prism and on the foil based on the images displayed on the visualizing unit.

15. The method of claim 11, wherein the functional element includes a light source; and positioning the functional element on the prism, further includes:

providing a camera configured to receive light from the light source to produce an image;

providing a visualizing unit configured to display images obtained by the camera; and positioning the functional element on the prism and on the foil based on the images displayed on the visualizing unit.

16. The method of claim 11, wherein the functional element includes a passive element configured to reflect or diffract incoming light, the passive element comprising at least one of a crystal, a mirror element, or a grating; and positioning the functional element on the prism, further includes:
- providing a light source configured to illuminate the passive element;
- providing a camera configured to receive light emitted by the passive element when illuminated by the light source;
- providing a visualizing unit configured to display images obtained by the camera; and
- positioning the functional element on the prism and on the foil based on the images displayed on the visualizing unit.

17. A method for mounting a functional element in a lens, the method comprising:
- mounting the functional element on a first side of a foil;
- positioning a second side of the foil on a closed contour alignment surface of an alignment tool;
- applying a pressure on a central opening of the alignment tool, the central opening surrounded by the closed contour alignment surface, to maintain the foil with the functional element on the alignment tool;
- cutting a foil section from the foil, the foil section including the functional element,
- adjusting at least one of a position or orientation of the foil section to align the functional element with a predetermined position or orientation, respectively;
- fixing the position or orientation of the foil section;
- positioning the foil and functional element a predetermined distance from a front surface of a casting mould; and
- casting and curing a polymer with the foil and functional element embedded therein.

18. The method of claim 17, wherein the foil section is either partially connected to the foil to form a flap or is detached from the foil.

19. The method of claim 17, wherein fixing the position or orientation of the foil section includes:
- applying an adhesive to an edge of the foil section to secure the foil section to the foil thereby maintaining the functional element in alignment with the predetermined position or orientation.

20. The method of claim 17, wherein mounting the functional element on a first side of a foil, further includes:
- mounting the functional element on a flexible printed circuit board; and
- mounting the flexible printed circuit board on the first side of the foil.

* * * * *